(12) United States Patent
Vezard

(10) Patent No.: US 6,392,238 B1
(45) Date of Patent: May 21, 2002

(54) UV-IMAGER SYSTEM

(75) Inventor: Nicolas Vezard, Metuchen, NJ (US)

(73) Assignee: Jobin Yvon Inc., Edison, NJ (US)

(*) Notice: Subject to any disclaimer, the term of this patent is extended or adjusted under 35 U.S.C. 154(b) by 0 days.

(21) Appl. No.: 09/328,811

(22) Filed: Jun. 9, 1999

(51) Int. Cl.[7] .......................... G01J 1/42; G03B 13/02
(52) U.S. Cl. ........................ 250/372; 396/374
(58) Field of Search ...................... 250/372; 358/51; 359/351, 353, 355, 359, 356, 361; 396/354, 447, 374

(56) References Cited

U.S. PATENT DOCUMENTS

| | | | | |
|---|---|---|---|---|
| 4,047,206 A | * | 9/1977 | Kitagami et al. | 396/358 |
| 5,149,972 A | * | 9/1992 | Fay et al. | 250/461 |
| 5,481,401 A | * | 1/1996 | Kita et al. | 359/353 |
| 5,485,530 A | * | 1/1996 | Lakowicz et al. | 382/191 |
| 5,581,356 A | * | 12/1996 | Vezard | 356/418 |
| 5,932,886 A | * | 8/1999 | Arai et al. | 250/504 R |
| 6,009,340 A | * | 12/1999 | Hsia | 600/407 |

OTHER PUBLICATIONS

Eliadis, E., Article: UV Photography [online]Nov. 1997 ([retrieved on Aug. 29, 2000]. retrieved from the Internet: URL http:///users.hol.gr/~eliad/uvtheo.htm.*

KSS1001 Basic Direct View KRIMESITE™ SCOPE [online] Sirchie Finger Print Laboratories, Inc., 1999 [retrieved on Aug. 29, 2000]. Retrieved from the Internet: URL http://www.ruvis.com/basic.htm.*

Scenescope [online] Instruments S.A., Inc. 1998 [retrieved on Aug. 29, 2000]. Retrieved from the Internet: URL http://www.crimescope.com/Scene/scenesco.htm.*

The Full Fingerprint Solution [online] Instruments S.A., Inc. 1998 [retrieved on Aug. 29, 2000]. Retriefved from the Internet: URL http://www.crimescope.com/JYHads2_FINALFINAL_RnB.pdf.*

* cited by examiner

Primary Examiner—Constantine Hannaher
Assistant Examiner—Albert Gagliardi
(74) Attorney, Agent, or Firm—Handal & Morofsky

(57) ABSTRACT

A UV-Imager system includes a camera. The camera includes a first UV coated mirror and a quartz UV transmittive camera lens. The UV-Imager system also includes a second UV coated mirror coupled to the camera, and an intensifier coupled to the second UV coated mirror.

19 Claims, 2 Drawing Sheets

UV-IMAGER SYSTEM

FIELD OF THE INVENTION

The present invention is directed to the detection of fingerprints and other forensic evidence. The invention provides a novel system for detecting images by ultraviolet light ("UV" hereinafter). More particularly, the present invention is directed to a UV-imager system that photographs and provides simultaneous viewing of fingerprints and other evidence.

BACKGROUND OF THE INVENTION

Special tools are frequently used by law enforcement personnel when evaluating a crime scene to collect forensic evidence that is invisible to the human eye. Examples of such evidence include bodily fluids, fingerprints on porous and non-porous surfaces, forged documents, explosive residue, and trace evidence e.g., hair, fibers, etc. One commonly used tool is a forensic light source that utilizes fluorescent light to detect and record forensic evidence.

A recently introduced complementary tool to the forensic light source is a tool that relies on intensified short-wave ultraviolet ("UV") reflectance instead of fluorescence. Such a UV tool can reveal additional evidence on non-porous surfaces where a forensic light source is not useable or the subject requires processing with powders or fluorescent dyes.

In conventional forensic tools that utilize UV reflectance from a UV source a traditional photograph is taken at the output of an intensifier tube. However, photography at the output of an intensifier is limited in resolution by the number of line pairs/mm specification of each intensifier.

One UV tool that does not rely on the output of an intensifier to obtain a photography is a "SceneScope" (trademark) UV-Imager which is a system with a modified Nikon FM2 camera available from Instruments S.A., Inc. The prior art Scenescope utilizes an intensifier and a modified 33 mm camera to provide both non-intensified photography of reflectance of fingerprints on various backgrounds, and simultaneous intensified image focusing and viewing. An intensifier is useful to obtain the focus when using an invisible light source such as UV (200–400 nm) or infrared (above 700 nm) since UV or infrared images will not be visible to, and may be harmful to, the naked eye. The intensifier operates electronically to increase the luminescence of the image and provide a visible wavelength output for example on a video screen. However, one problem with the prior art SceneScope is that the image quality is degraded because a relatively low percentage of UV light is reflected by the 35 mm camera.

Based on the foregoing, there is a need for an improved UV-Imager system.

SUMMARY OF THE INVENTION

One embodiment of the present invention is a UV-Imager system that includes a camera. The camera includes a first UV coated mirror and a quartz UV transmissive camera lens. The UV-Imager system also includes a second UV coated mirror coupled to the camera through a lens system, and an intensifier coupled to the second UV coated mirror.

BRIEF DESCRIPTION OF THE DRAWINGS

Some embodiments of the invention will now be described by way of example with reference to the accompanying drawings in which.

DETAILED DESCRIPTION

Figure 1:
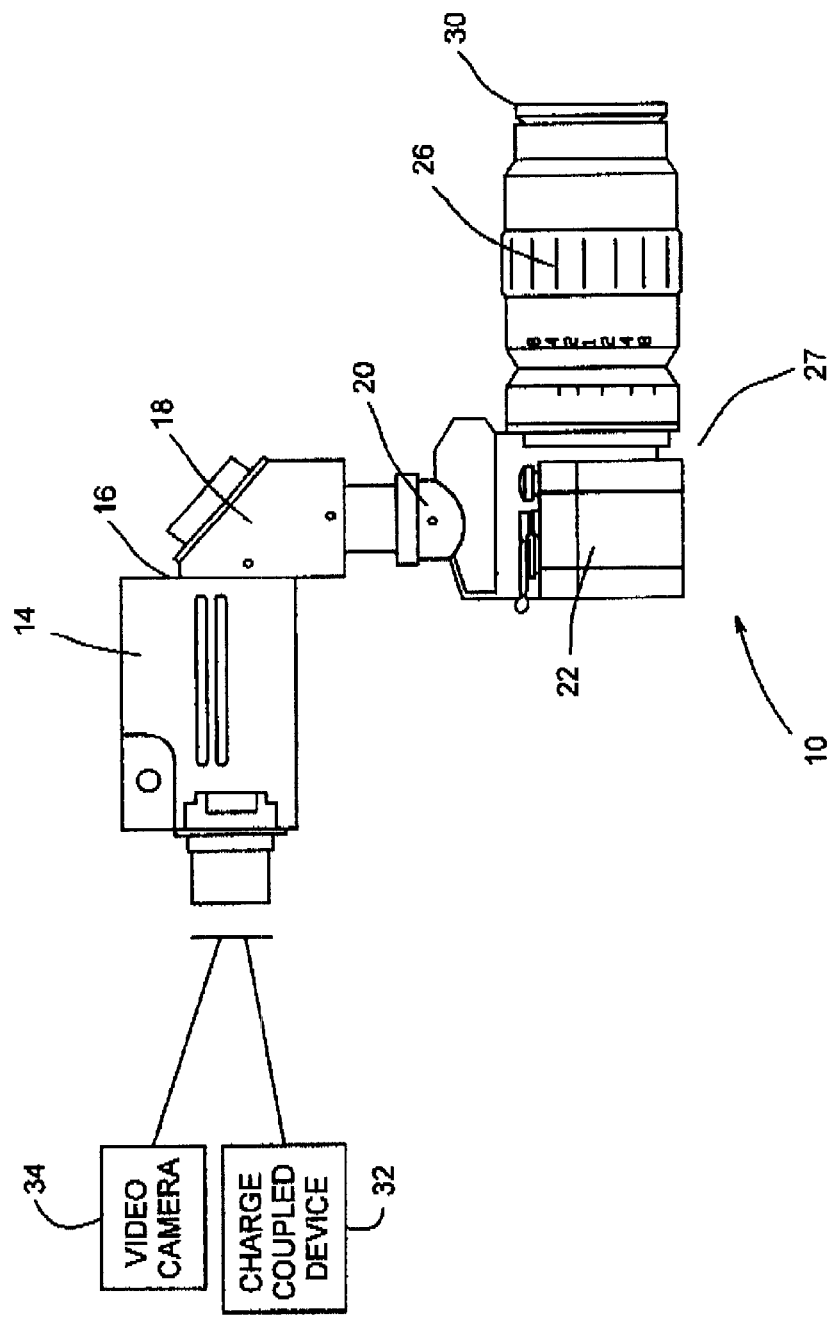
FIG. 1 is a side view of a UV-imager system in accordance with one embodiment of the present invention.
Figure 2:
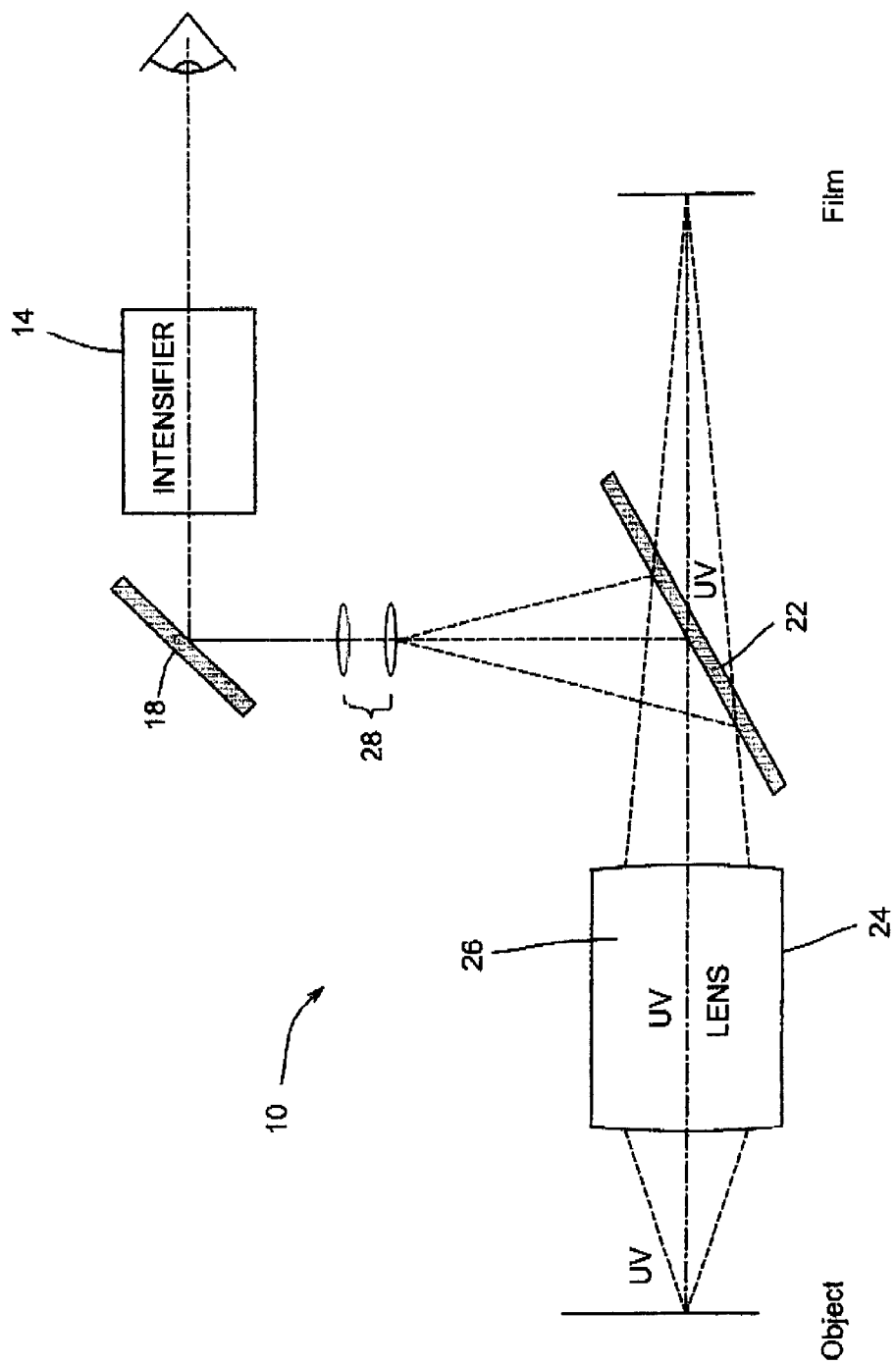
FIG. 2 is a schematic optical diagram of the UV-imager system shown in FIG. 1.

One embodiment of the present invention is a UV-Imager system that includes UV coated mirrors to increase the amount of internally reflected UV light.

Referring to the drawings, UV-Imager system 10 includes a camera 24. Camera 24 can be a modification of a conventional camera. In one embodiment, camera 24 is a modified FM2 camera from Nikon Corp.

The conventional Nikon FM2 camera is modified by removing the mirror included with the camera and replacing it with a UV reflective coated mirror 22. The UV reflection coating of mirror 24 reflects light with wavelengths within the range of approximately 200–3600 nm. In one embodiment, the coating of UV coated reflective mirror 22 provides peak reflecting at approximately 254 nm, and reflects 90–95% of UV light compared to 20–25% reflection for a conventional mirror.

Camera 24 further includes a dual lens system 28 that replaces the prism found in a conventional camera. In one embodiment, the dual lens system includes two lenses, each of which is a silica lens with a focal length of 50 mm and diameter of 22.5 mm. In addition, camera 24 does not have a focusing screen that is included in conventional cameras.

Camera 24 is loaded with a UV sensitive film. In one embodiment, the film is Kodak Tri-X 400 ASA.

Camera 24 includes a UV transmittive camera lens 26. Camera lens 26 can be any known manual or motorized lens or zoom lens that is made of UV transmissive material. In one embodiment, camera lens 26 is a modified 105 mm Nikon quartz lens. Coupled to lens 26 is a 254 nm filter 30. In another embodiment, two stacked 254 nm filters 30 are coupled to lens 26. This embodiment is more suitable for outdoor use.

Camera 24 is coupled to a second mirror holder 18 by a lockable mechanism 20. Lockable mechanism 20 allows second mirror holder 18 to be adjusted relative to camera 24. Second mirror holder 18 includes a UV reflective coated mirror (not shown) having a coating reflecting UV within the range of approximately 200–360 nm.

Second mirror holder 18 is coupled to an intensifier 14 through a flush contact 16. Intensifier 14 intensifier light received from second mirror holder 18 so that the light image can be directly viewed or sent to a charge-coupled device.

("CCD"). Intensifier 14 can be a first, second, or third generation intensifier, or merely a UV to green light converter.

An eyepiece 12 is coupled to intensifier 14. Eyepiece 12 can be used for direct eye viewing. Further, a CCD 32 or a video camera 34 can be coupled to eyepiece 12 to provide video monitor viewing/focusing or videotaping while the objects are photographed on the UV film.

In combination, UV-imager system 10 allows fingerprints or other forensic objects to be photographed by camera 24, or simultaneously viewed through eyepiece 12. The UV-reflective coating on the mirrors of system 10 boost the UV reflectance which enhances the image of the objects. The removal of the focusing screen and the prism in from camera 24 increases the UV transmission towards intensifier 14. Dual lens system 28 between mirror 24 and second mirror holder 18 re-images the objects as a flat field onto the front face of intensifier 14.

Several embodiments of the present invention are specifically illustrated and/or described herein. However, it will be appreciated that modification and variations of the present invention are covered by the above teachings and within the purview of the appended claims without departing from the spirit and intended scope of the invention.

For example, in the embodiments shown in FIG. 1, the intensifier is separate from the camera. However, provided the camera body is large enough, the intensifier can be installed inside the camera body. This can reduce the number of optics and increases the image quality on the output of the intensifier.

What is claimed is:

1. An ultraviolet light imager comprising:
   a) a camera having:
      i) a focusable camera lens to input ultraviolet light images to the camera, the camera being loadable with a film to capture images received from the camera lens, the spacing of the camera lens from the film, when loaded, being adjustable to focus an input ultraviolet image on the film; and
      ii) a camera mirror having an ultraviolet—reflective surface to reflect image light received from the camera lens to provide a reflected ultraviolet image for use in focusing the camera lens; and
   b) an image intensifier optically coupled to the camera to receive the reflected ultraviolet image from the camera mirror and provide a viewable output;
   wherein the reflected ultraviolet image is focused to the viewable output of the intensifier.

2. An ultraviolet light imager according to claim 1 wherein the camera lens is an ultraviolet—transmissive, optionally quartz, lens.

3. An ultraviolet light imager according to claim 1 comprising an ultraviolet filter for the camera lens, the ultraviolet filter optionally transmitting at about 254 nm.

4. An ultraviolet light imager according to claim 1 wherein the camera comprises a viewing lens system to received an ultraviolet image reflected by the camera mirror and project said ultraviolet image to the image intensifier.

5. An ultraviolet light imager according to claim 4 wherein the camera comprises a single lens reflex camera having the conventional prism and focusing plate replaced by the focusing lens system.

6. An ultraviolet light imager according to claim 1 comprising a second mirror having an ultraviolet—reflective surface, optionally a surface reflecting ultraviolet light at wavelengths from about 200 to about 360 nm, the second mirror being capable of reflecting to the intensifier images received from the camera mirror.

7. An ultraviolet light imager according to claim 6 comprising a mirror holder housing the second mirror and a lockable mechanism coupling the mirror holder to the camera.

8. An ultraviolet light imager according to claim 7 wherein the lockable mechanism is adjustable relative to the camera.

9. An ultraviolet light imager according to claim 1 wherein the camera mirror reflects ultraviolet light at a wavelength of from about 200 to about 360 nm, optionally about 254 nm.

10. An ultraviolet light imager according to claim 1 comprising an eyepiece coupled to the intensifier.

11. An ultraviolet light imager according to claim 10 comprising a charge-coupled device coupled to the eyepiece.

12. An ultraviolet light imager according to claim 11 comprising a video camera coupled to the eyepiece.

13. An ultraviolet light imager according to claim 1 wherein the intensifier is a first, second or third generation intensifier.

14. An ultraviolet light imager according to claim 1 wherein the intensifier is a UV—to—green light converter.

15. An ultraviolet light imager according to claim 1 comprising an ultraviolet—sensitive film loaded in the camera.

16. An ultraviolet light imager comprising:
   a) a camera having:
      i) a focusable camera lens to input ultraviolet light images to the camera, the camera lens being an ultraviolet—transmissive, optionally quartz, lens;
      ii) a film to capture images received from the camera lens, the spacing of the camera lens from the film being adjustable to focus an ultraviolet image on the film; and
      iii) a camera mirror having an ultraviolet—reflective surface to reflect a portion of the image light received from the camera lens to provide a reflected ultraviolet image for use in focusing the camera lens;
   b) an imager intensifier optically coupled to the camera to receive the reflected ultraviolet image from the camera mirror and provide a viewable output;
   c) a viewing lens system to receive an ultraviolet image reflected by the camera mirror and project said ultraviolet image to the image intensifier, said lens system replacing the conventional prism and focusing plate of a single lens reflex camera; and
   d) a second mirror having an ultraviolet—reflective surface, optionally a surface reflecting ultraviolet light at wavelengths from about 200 to about 360 nm, the second mirror being capable of reflecting to the intensifier images received from the camera mirror;
   wherein the reflected ultraviolet image is focused to the viewable output of the intensifier.

17. An ultraviolet light imager according to claim 16 comprising a mirror holder housing the second mirror and a lockable mechanism coupling the mirror holder to the camera wherein the lockable mechanism is adjustable relative to the camera.

18. An invisible wavelength light imager comprising:
   a) a camera having:
      i) a focusable camera lens to input invisible wavelength light images to the camera;
      ii) a film to capture images received from the camera lens, the spacing of the camera lens from the film being adjustable to focus an invisible wavelength image on the film; and
      iii) a camera mirror having an invisible wavelength—reflective surface to reflect a portion of the image light received from the camera lens to provide a reflected invisible wavelength image for use in focusing the camera lens;
   and
   b) an image intensifier optically coupled to the camera to receive the reflected invisible wavelength image from the camera mirror and provide a viewable output;
   wherein the reflected invisible wavelength image is focused to the viewable output of the intensifier.

19. A method of performing ultraviolet light photography comprising:
   a) illuminating a subject with ultraviolet light;
   b) receiving an ultraviolet image of the subject on an ultraviolet—reflective camera mirror;

c) reflecting the ultraviolet image to an image intensifier for intensification;

d) using the intensified ultraviolet image to focus the camera on the subject; and e) opening the camera shutter to capture a focused ultraviolet image of the subject on film.

* * * * *

UNITED STATES PATENT AND TRADEMARK OFFICE
CERTIFICATE OF CORRECTION

PATENT NO.     : 6,392,238 B1                                               Page 1 of 1
DATED          : May 21, 2002
INVENTOR(S)    : Nicolas Vezard It is certified that error appears in the above-identified patent and that said Letters Patent is hereby corrected as shown below:

<u>Column 2,</u>
Line 17, change "3600 nm" to read -- 360 nm --.

<u>Column 3,</u>
Line 21, change "ultraviolet--reflective" to read -- ultraviolet-reflective --.
Line 31, change "ultraviolet--transmissive" to read -- ultraviolet-transmissive --.
Line 44, change "ultraviolet--reflective" to read -- ultraviolet-reflective --.

<u>Column 4,</u>
Line 5, change "UV--to--green" to read -- UV-to-green --.
Line 7, change "ultraviolet--sensitive" to read -- ultraviolet-sensitive --.
Line 13, change "ultraviolet--transmissive" to read -- ultraviolet-transmissive --.
Line 18, change "ultraviolet--reflective" to read -- ultraviolet-reflective --.
Line 31, change "ultraviolet--reflective" to read -- ultraviolet-reflective --.
Lines 51-52, change "wavelength--reflective" to read -- wavelength-reflective --.
Line 67, change "ultraviolet--reflective" to read -- ultraviolet-reflective --.

Signed and Sealed this

Twenty-first Day of January, 2003

JAMES E. ROGAN
*Director of the United States Patent and Trademark Office*